United States Patent
Landais

(10) Patent No.: US 11,120,841 B2
(45) Date of Patent: Sep. 14, 2021

(54) METHOD FOR AUTOMATICALLY DETECTING VIDEO INCIDENTS ON AN ELECTRONIC VIDEO PLAYBACK DEVICE

(71) Applicant: SAGEMCOM BROADBAND SAS, Rueil Malmaison (FR)

(72) Inventor: Thomas Landais, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/722,648

(22) Filed: Dec. 20, 2019

(65) Prior Publication Data

US 2020/0202899 A1    Jun. 25, 2020

(30) Foreign Application Priority Data

Dec. 21, 2018    (FR) ...................... 1873918

(51) Int. Cl.
   *G11B 27/36*      (2006.01)
   *G06N 20/00*      (2019.01)
   *G11B 27/34*      (2006.01)

(52) U.S. Cl.
   CPC ............ *G11B 27/36* (2013.01); *G06N 20/00* (2019.01); *G11B 27/34* (2013.01)

(58) Field of Classification Search
   CPC ........ G11B 27/36; G11B 27/34; G06N 20/00; H04N 21/64723; H04N 21/4425; H04N 21/44209; H04N 21/2402; H04L 65/80; H04L 65/4084
   USPC ...................................................... 386/263
   See application file for complete search history.

(56) References Cited

U.S. PATENT DOCUMENTS

| | | | |
|---|---|---|---|
| 2011/0107084 A1* | 5/2011 | Hubner | H04W 12/0013 713/153 |
| 2015/0110388 A1* | 4/2015 | Eaton | G06F 16/285 382/159 |
| 2015/0304737 A1 | 10/2015 | Franklin et al. | |
| 2017/0093648 A1* | 3/2017 | ElArabawy | H04L 41/5067 |
| 2018/0367844 A1 | 12/2018 | Fu et al. | |

OTHER PUBLICATIONS

Search Report as issued in French Patent Application No. 1873918, dated Jul. 4, 2019.
Dimopoulos, G., et al., "Measuring Video QoE from Encrypted Traffic," Internet Measurement Conference, ACM, Nov. 2016, XP058306547, pp. 513-526.

* cited by examiner

*Primary Examiner* — Thai Q Tran
*Assistant Examiner* — Nienru Yang
(74) *Attorney, Agent, or Firm* — Pillsbury Winthrop Shaw Pittman LLP

(57) ABSTRACT

A method for automatically detecting video incidents on a video played back by an electronic video playback device, includes acquiring a message; subtracting a counter included in the message previously acquired from a counter included in a message saved in a database to obtain a transition state of the electronic video playback device; classifying, by a supervised automatic learning algorithm, the transition state as a normal state of the played back video or as a video incident on the played back video; performing a video incident detection including the creation of an incident message; transmitting the incident message to a remote system; and recording the acquired message in the database.

11 Claims, 5 Drawing Sheets

METHOD FOR AUTOMATICALLY DETECTING VIDEO INCIDENTS ON AN ELECTRONIC VIDEO PLAYBACK DEVICE

CROSS REFERENCE TO RELATED APPLICATIONS

This application claims priority to French Patent Application No. 1873918, filed Dec. 21, 2018, the entire content of which is incorporated herein by reference in its entirety.

FIELD

The technical field of the invention is that of video playback. The present invention relates to a method for automatically detecting video incidents of a video played back by an electronic video playback device. It also relates to an electronic video playback device implementing this method, in particular by the implementation of an automatic learning algorithm to carry out the detection.

BACKGROUND

Users of electronic video playback devices may encounter so-called video incident problems during the playback of a video on a screen, for example: image freezes, black screens, image micro-freezes (also called "pixelisations").

"Electronic video playback device" is taken to mean any electronic device making it possible to play back in video form on a screen a video content from an external signal. "Electronic video playback device" will for example designate a decoder box, also called TV decoder, which receives an encrypted or compressed signal for television, decodes it by de-encrypting and/or decompressing it and plays it back on a screen. Such a decoder box may also be called "set-top box". "Electronic video playback device" could also designate "video sound box", a mobile telephone or an electronic tablet.

An electronic video playback device plays back on a screen a content from an external signal which can come for example:

From a satellite antenna or a UHF (Ultra High Frequency)/VHF(Very High Frequency) antenna.
From a public or local network via a telephone line, an optic fibre or an Ethernet cable.
From storage means connected by USB, SATA, Bluetooth or Wi-Fi to the device such as a USB key, a hard disk or another electronic device.

The video incidents cited previously may have various origins: deterioration of the signal during its transmission on the network, too low throughput, hardware problems of the electronic video playback device (problem of cable linking the device to the network or cable linking the device to the screen, etc.).

To detect these video incidents, several systems are proposed in the prior art. A first solution consists in analysing directly the video stream transmitted by the electronic video playback device on the screen. These systems may be very precise and detect many different video incidents, and are agnostic to the playback device used. However, these systems, carrying out image processing on the video stream, require a lot of resources and do not make it possible to work back to the source of the incident. Indeed, the processing is carried out on the final result and not upstream.

In order to work back to the source of an incident, other systems analyse the content delivery network (CDN). However, these systems only make it possible to detect screen freezes that stem uniquely from a problem on the network. These systems required less resources than the processing of the final video stream, but only make it possible to detect one type of incident, only stemming from one type of problem: network problems.

It thus appears desirable to detect different types of video incidents and to be able to work back to their cause, whether it is a network problem, a hardware problem of the video playback device, or a software problem of the video playback device, while requiring few resources.

SUMMARY

An aspect of the invention offers a solution to the problems mentioned previously, by enabling an automatic detection of video incidents of a video played back on a screen by an electronic video playback device requiring few resources, making it possible to detect different types of video incidents and to be able to work back to their cause whether it is a network problem, a hardware problem of the video playback device, or a software problem of the video playback device.

To do so, an aspect of the invention relates to a method for automatically detecting video incidents on a video played back by an electronic video playback device characterised in that it includes:

A step of acquisition of a message transmitted by the electronic video playback device, the message including at least one counter representing the state of the electronic video playback device;

A step of subtraction of the at least one counter included in the message previously acquired from the at least one counter included in a message saved in a database corresponding to a preceding state of the electronic video playback device to obtain a transition state of the electronic video playback device;

A step of classification, by a supervised automatic learning algorithm using a classification model, of the transition state as belonging to a class representative of a normal state of the played back video, or as belonging to a class among at least one class representative of a video incident on the played back video;

A step of detection of a video incident including the creation of an incident message when a transition state is classified as belonging to a class representative of a video incident on the played back video, the incident message including a label corresponding to the detected video incident, the transition state and the acquired message;

A step of transmission of the incident message to a remote system;

A step of recording the message previously acquired in the database.

The invention beneficially makes it possible, by positioning the detection of video incidents at the level of the video playback device, to be able to work back to the cause of the incident, whether it is a network problem, a hardware problem of the video playback device, or a software problem of the video playback device. Indeed, the video playback device is beneficially situated at the edge of the content distribution network, directly connected to the screen, it thus makes it possible to identify the user suffering the video incidents, as well as the state of the different modules of the device at the moment when the incident has been suffered, and thus to detect the problems, whether they are network problems, internal device problems or instead problems linked to the video stream.

In addition, the detection is carried out via a supervised automatic learning algorithm, which classifies the states of the playback device. A state of the device is represented by counters, coming from an event file (so-called "log" file) of the device or a message transmitted by the device. Thus, thanks to the use of these counters, it is possible to define a state of the device when an incident has been detected.

Apart from the characteristics that have been described in the preceding paragraph, the method according to an aspect of the invention may have one or more complementary characteristics among the following, considered individually or according to all technically possible combinations thereof:

The method is repeated at least twice.
The repetition of the method is carried out at fixed time intervals.
The repetition of the method is carried out at variable time intervals.
The method further includes a step of dimensionality reduction of the message including the reduction of the number of counters included in the message.
The method further includes:
   A step of training the supervised automatic learning algorithm to create a classification model, using a set of training data including at least one annotated message as belonging to a class representative of a normal state of the played back video, or as belonging to a class among at least one class representative of a video incident on the played back video, the message including at least one counter;
   A step of testing the classification model using a set of test data including at least one non-annotated message.
The method is characterised in that the supervised automatic learning algorithm is an algorithm of a type among those of gradient tree boosting, support vector machines, neural networks, decision trees.
The method is implemented by at least one system remote from the electronic video playback device.

Another aspect of the invention relates to an electronic video playback device implementing the method including:
   A module for acquisition and subtraction of a message, configured to carry out the steps of acquisition and subtraction of the message;
   A classification module, configured to carry out the steps of classification, incident detection and transmission of the incident message;
   A model recording module, configured to store the classification model;
   A message recording module, configured to carry out the step of recording a message.

Another aspect of the invention relates to a system for detecting video incidents characterised in that it includes the electronic video playback device and a remote system for receiving and displaying an incident message including:
   A module for recording an incident message;
   A module for displaying an incident message on a screen for analysis by an expert in the field.

Another aspect of the invention relates to a computer programme product including instructions which, when the programme is executed by a computer, lead it to implement the method.

Another aspect of the invention relates to a computer readable recording support (e.g. a non-transitory computer readable medium) including instructions which, when they are executed by a computer, lead it to implement the method.

The invention and its different applications will be better understood on reading the description that follows and by examining the figures that accompany it.

BRIEF DESCRIPTION OF THE FIGURES

The figures are presented for indicative purposes and in no way limit the invention.

DETAILED DESCRIPTION

Unless stated otherwise, a same element appearing in the different figures has a single reference.

Figure 1:
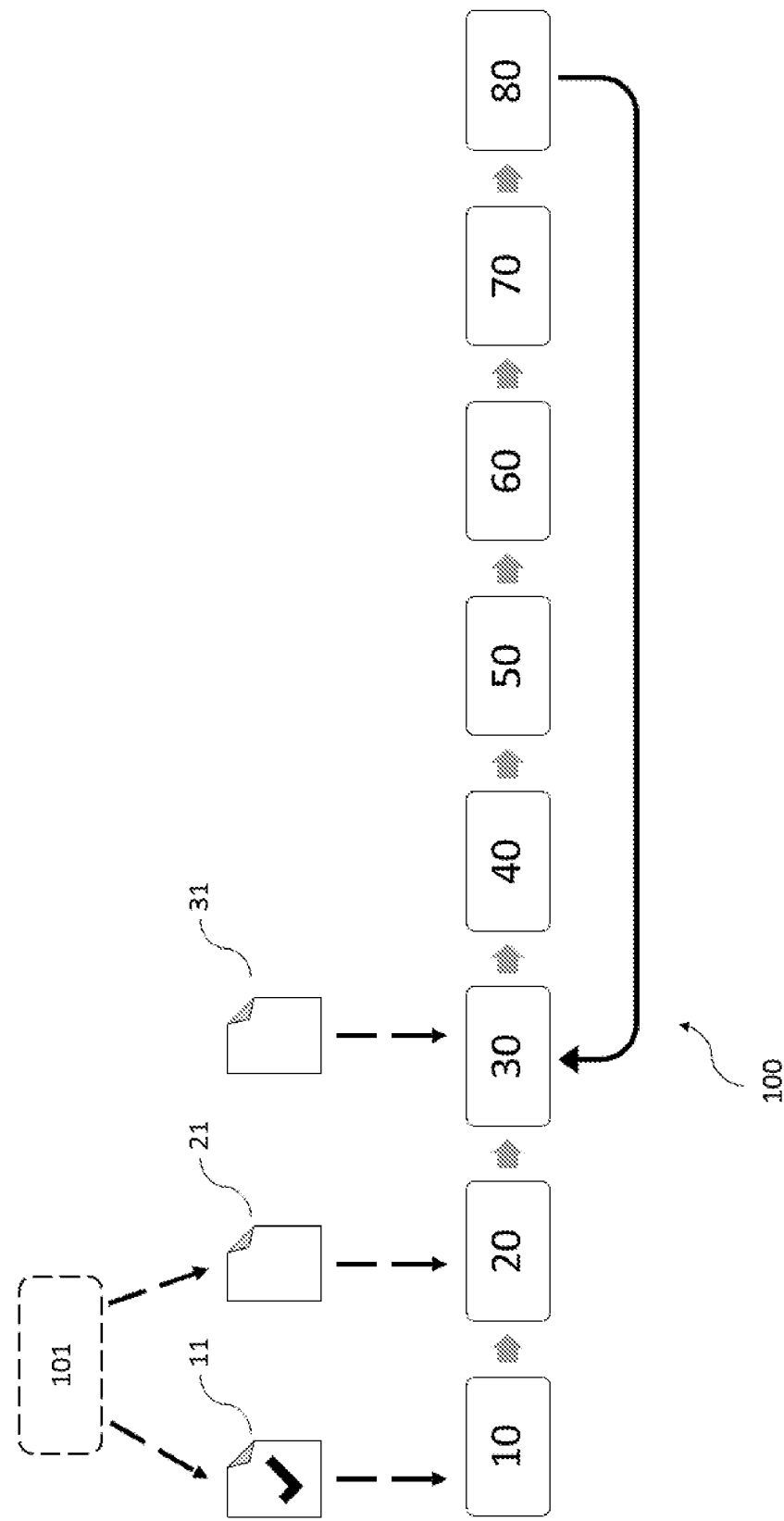
FIG. 1 shows a schematic representation of a first embodiment of a method according to the invention.

FIG. 1 represents an embodiment of the method for detecting video incidents of a video played back by an electronic video playback device.

The method 100 for automatically detecting video incidents includes a step 10 of training a supervised automatic learning algorithm, a step 20 of testing an estimated model, a step 30 of acquisition of a message, a step 40 of subtraction of a counter included in the acquired message from a counter included in a message recorded in a database corresponding to the last but one acquired message to obtain a transition state, a step 50 of classification of the transition state, a step 60 of detection of a video incident, a step 70 of transmission of the incident message and a step 80 of recording the acquired message in a database.

The first step 10 of training a supervised automatic learning algorithm includes the creation of a classification model, and the storage of this model.

"Supervised automatic learning algorithm" is taken to mean an optimisation algorithm capable of estimating a model from data selected in finite number, then using the estimated model to carry out a task by taking non-selected data as input. In the invention, the task to carry out is the classification of messages. Such an algorithm is designated "supervised" when the data selected and supplied as input of the algorithm during the training phase are annotated. In the invention, during the training step 10, already classed messages 11 (that is to say annotated as belonging to a class) are supplied as input of the algorithm. In an embodiment, the algorithm is in the form of machine executable instructions stored on a non-transitory computer readable medium.

The annotated messages 11 include counters. These counters already exist within the electronic video playback device. "Counter" is taken to mean a variable taking a value making it possible to represent the state of the device. When an event happens, a counter may be incremented. For example, during the loss of a signal, a counter called "signal_lost" may be incremented by the video playback device, making it possible to retain a trace of the number of times that a signal has been lost. It is also possible for example to have a counter that retains in memory a session number, making it possible to link another counter to the session during which the event has taken place.

For example, the message may be in JSON format or another data format using a so-called "key-value" formalism and may contain the following counters:

```
"fe": {
"signal_lost": 0,
"signal_recovered": 0,
"signal_low": 0
}
```

These counters make it possible, thanks to the inventory of the number of events linked to the signal, to represent the state of the signal received, and thus to work back to the problems linked to the network through which the signal is received.

```
"video": {
"changed": 0,
"io_changed": 0,
"ar_changed": 0,
"eotf_changed": 0,
"not_found": 0,
"error_format": 0,
"removed": 0}
```

These counters make it possible, thanks to the inventory of the number of events linked to the video, to represent the state of the played back video, and thus to work back to the problems linked to the processing of the signal received by the device for playing it back in video form.

```
"resources": {
"priority_updated": 0,
"error": 0,
"busy": 0,
"no_resources": 0,
"ok": 0,
"earned": 0,
"lost": 0,
"released": 0}
```

These counters make it possible, thanks to the inventory of the number of events linked to the resources of the device, to represent the state of the device in terms of hardware ("busy" indicates for example that a hardware part of the device is busy) and thus to work back to problems linked to the hardware.

These examples of counters are in no way limiting and it is possible to select a greater number of counters to have a higher precision with regard to the origin of an incident, which will lead to a greater number of data to process. It is also possible to choose a smaller number of counters to have less data to process, which would lead to lower precision.

The annotated messages 11 are attributed a class, for example by an operator. In the invention, "annotating a message" is taken to mean the creation of a new message including the message to annotate and a label including the name of the class attributed to the message. The classes have been selected from among the following: a "normal state" class, representative of a normal state of the played back video. The message has been annotated by an operator for example as corresponding to a normal state of the played back video, that is to say that the operator has not detected an incident in the played back video or that he has detected incidents below an acceptability threshold that he will have determined. For example, he may have noticed a micro-freeze (small zone of pixels frozen on the screen), and decided that this incident did not belong to a "normal state" class of the played back video, as a function of a detection precision that he will have set. He may also decide that this incident belongs to a "micro-freeze" class, for greater precision in the detection of incidents. In an aspect of the invention, several classes representative of an incident on the played back video may exist jointly. For example, in a non-limiting manner, "micro-freeze", "freeze" (when the screen is frozen in significant proportion, for example on half of the screen or the whole screen) and "black screen" (when there is no image on the screen) classes of incident may exist. These examples are non-limiting because numerous classes of incident may exist as a function of the video incidents that it is wished to detect.

During the training step 10, the supervised automatic learning algorithm thus receives as input annotated data 11, coming from a set of data 101, the training data 11 including a message including counters and a class label defined for example by an operator according to the formalism explained previously.

The supervised automatic learning algorithm may be for example of "gradient boosting" type. "Boosting" is a model aggregation technique, each model having been created during a training step and the weight of each of the models aggregated by the final model being corrected at each training iteration. For example, in the case of decision tree boosting, each of the models is a "weak" decision tree. A model is designated "weak" when the probability of success on a prediction is slightly greater than that of a random choice. The boosting technique filters the training data received: the simple training data to process are left to the already existing weak models, and other weak models are created to classify the residual training data that existing models do not know how to process. At the following training iteration, the residual training data of the preceding iteration will no longer be residual since a weak model will have been created to process them. The final model aggregates all the weak models. In the case of decision tree boosting, it is a complex decision tree created from simple decision trees. The weight of each of the weak models in the strong model is re-evaluated at each iteration of the training step as a function of the classification performances of each of the weak models.

In a supervised automatic learning algorithm, it is sought to optimise (maximise or minimise, depending on the case) the objective function (or "loss function"). This function compares the output predicted by the algorithm with the expected output (the label). This function is optimised by playing on the parameters of the model. In the case of a decision tree boosting algorithm, the parameters are for example the number of "weak" trees and their size, the size of the "strong" tree or instead the weight of each of the weak trees within the strong tree. The term "gradient" in "gradient boosting" refers to the use of a gradient descent to optimise the objective function. The addition of a "weak" tree to process the residual training data thus follows a gradient descent of the objective function to optimise it. If adding a weak tree does not come down to carrying out a gradient descent on the objective function, then the weak tree is not added.

An implementation of the gradient tree boosting algorithm may be used, such as "XGBoost" for "eXtreme Gradient Boosting" described in ["XGBoost: A Scalable Tree Boosting System", Tianqi Chen and Carlos Guestrin, arXiv:1603.02754].

Other supervised automatic learning algorithms may be used, in a less beneficial alternative, for example neural networks, simple decision trees, support vector machines (SVM), the k-nearest neighbours (KNN) method.

When a model has been created from the training data 11, the model is saved to be used in the following steps.

In a test step 20, the robustness of the estimated model is tested with test data 21, coming from the same set of data 101 as the training data. The estimated model is proposed as input of the non-annotated messages 21, and the prediction of the model is compared with the expected output. The robustness of the model will then be evaluated by an expert in the field, that is to say that the number of false positives (test data classed as not belonging to the "normal state" class of the played back video, whereas they belong thereto) and false negatives (test data classed as belonging to the "normal state" class of the played back video, whereas they do not belong thereto) must not exceed a certain threshold set by the expert.

A step 30 of acquisition of messages includes the acquisition of a message or an event file of the electronic video playback device including at least one counter. This acquisition may for example be carried out by receiving a message including counters from the electronic video playback device, or by sending a request to obtain these counters. This step 30 of acquisition of messages may include a sub-step, not represented, of dimensionality reduction, including the reduction of the number of counters of the message. This dimensionality reduction may be carried out for example using a principal components analysis, making it possible to transform the characteristics (which are correlated with each other since linked to the same events) into new characteristics decorrelated from each other, or by using any other matrix dimensionality reduction technique known to those skilled in the art such as linear discriminant analysis, canonical correlations analysis, or calculation of the F-score of each of the counters.

A step 40 of subtraction of the at least one counter included in the acquired message from the at least one counter included in a message recorded in a database corresponding to the last but one acquired message is next carried out. This step makes it possible to obtain a transition state of the electronic video playback device between two acquired messages. Indeed, it is necessary to carry out the subtraction of the counters of the acquired message (the final acquired message) from the counters of the message acquired previously (the last but one acquired message) to only keep the values that have changed during the time interval that has gone by between two message acquisitions. The set of counters for which the value has changed thereby represents a "transition state" of the electronic video playback device, and makes it possible to detect a video incident in this transition interval. If no counter is recorded in the database, that is to say that if the acquired message is the first acquired message, it is considered that all the counters of the preceding state are at a zero value.

A step 50 of classification of the transition state is carried out by the automatic learning algorithm previously driven using the model previously estimated at step 10 and tested and validated at step 20. The automatic learning algorithm receives as input the transition state previously created by subtracting the counters included in two messages, and classifies it as belonging to a class representative of a normal state of the played back video, or as belonging to a class among at least one class representative of a video incident of the played back video. "Classifies it as belonging to a class" is taken to mean the addition of a label to the transition state corresponding to the class in which it has been classified. For example, when the transition state is classed as belonging to a class representative of a normal state of the played back video, the algorithm adds to it a "normal state" label. When the transition state is classed as belonging to a class among at least one class representative of a video incident of the played back video, the algorithm adds to it a label corresponding to the class of incident in which it has been classed.

A step 60 of detection of a video incident includes the creation of an incident message when the transition state is classed as belonging to a class among at least one class representative of a video incident of the played back video. This video incident message may include the transition state corresponding to a state between two acquisitions of messages of the playback device when a video incident has been detected, the acquired message, and a label corresponding to the detected video incident.

A step 70 of transmission of the incident message may include the transmission of the incident message to a device remote from the electronic video playback device. This remote device may be for example accessible via a network. In so doing, an operator or an expert in the field is able to analyse the incident that has been detected thanks to the label included in the incident message, and he is capable of working back to the problem at the origin of the incident, thanks to the transition state included in the incident message, that the problem is of hardware type of the playback device, of software type of the video playback device, or instead coming from a problem on the network. The electronic video playback device beneficially has in fact knowledge of all these domains thanks to the counters included in the messages or event files, since it is situated at the network edge, directly in the user's premises at the end of the transmission chain. The transition state thus makes it possible to pass on all these items of information and to link them thereafter with a detected incident.

In a recording step 80, the acquired message is recorded in a database. The counters included in the saved message make it possible to carry out the subtraction of the step 40 of the counters of the acquired message from the counters of the message saved to obtain a transition state.

Steps 30 to 80 are repeated at least twice. This repetition beneficially makes it possible to detect video incidents in a regular manner and to monitor the evolution of the state of the video playback device. Indeed, only knowing a state of the counters, it is not possible to know when these have been incremented previously. To detect video incidents from the state of the counters, it is desirable to know the changes of state of the counters.

According to a first embodiment, this repetition is carried out at regular intervals, for example at intervals of 5 seconds. This interval conditions the detection delay, and thus the precision of the detection. It also conditions the duration of the events to detect. Indeed, in the case of an interval of 5 seconds, an event of 7 seconds will not be detected (its counter will not be incremented) in a first interval of 5 seconds but in a second interval of 5 seconds (its counter will have been incremented). If this event has a negative impact on the played back video, a video incident will only be detected after two intervals of 5 seconds, i.e. at the end of 10 seconds, whereas it will perhaps have started as of the start of the event, or 10 seconds before the detection. Indeed, the automatic learning algorithm is going to classify the acquired messages, it is thus going to classify the counters and their values. It is thus necessary to adapt this fixed interval to the duration of the video incidents that it is wished to detect.

Figure 2:
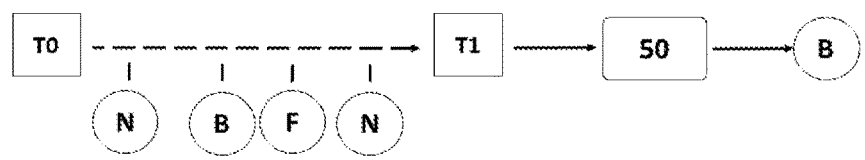
FIG. 2 shows a schematic temporal representation of the first embodiment of the method according to the invention.

FIG. 2 schematically represents this first embodiment at fixed time intervals. During the interval T1-T0, it may be remarked that four events have taken place. These events are either:

- a normal event (N), that is to say that one or more counters have been incremented further to a normal event (for example a start of stream reception, a change of the video further to a change of channel of the user)
- a "freeze" incident (F), that is to say that one or more counters have been incremented further to a freeze of the played back video.
- a "black screen" incident (B), that is to say that one or more counters have been incremented further to a black screen.

When the counters representing the transition state in the interval T1-T0 are classified at step 50, the model only detects one event. To do so, it is desirable that it knows a hierarchy in the events, defined by an expert in the field. For example, in FIG. 2, in the interval T1-T0, the events "normal state (N)", "black screen (B)", "freeze (F)" then "normal state (N)" follow each other. However, the classification model used by the supervised automatic learning algorithm at step 50 only detects an event according to, for example, the following hierarchy: Black screen>Freeze>Normal. It may thus be seen in FIG. 2 that the model has detected a black screen, since it is the event that has the highest importance in the hierarchy. If, during the interval T1-T0, only a screen freeze (F) and a normal event (N) had taken place, the model used at step 50 would have detected a screen freeze (F).

Figure 3:
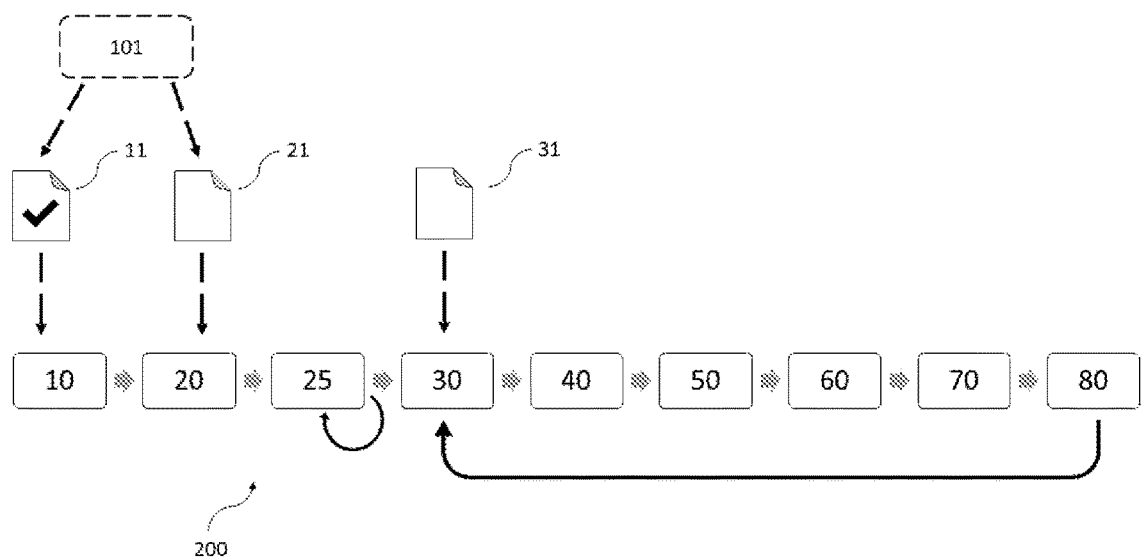
FIG. 3 shows a schematic representation of a second embodiment of the method according to the invention.

FIG. 3 represents a second embodiment including an additional step 25 of monitoring of the counters, which is repeated at high frequency to monitor the state of the counters.

Figure 4:
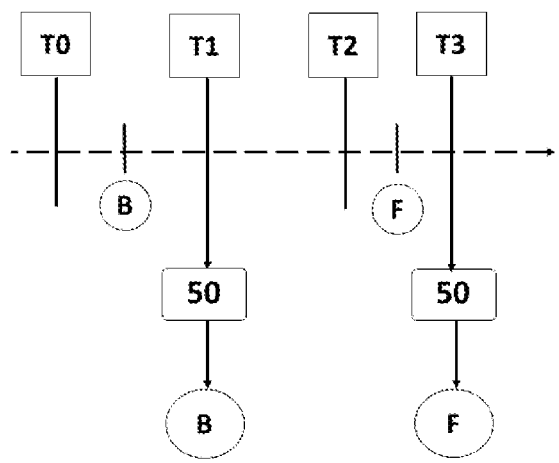
FIG. 4 shows a schematic temporal representation of the second embodiment of the method according to the invention.

FIG. 4 temporally represents this second embodiment, in which this repetition of steps 30 to 80 is carried out at variable time intervals, that is to say that an interval between two acquisitions will not necessarily be equal in time to an interval between two other acquisitions. This makes it possible to resolve the problems linked to the first embodiment, less advantageous, which does not make it possible for example to detect all the incidents. If there are several thereof during a fixed interval, in the first embodiment, only one, that considered as the most important according to a hierarchy, will be detected. In this second embodiment, an optimal variable time interval is found so as to detect not only a part of an event (if a fixed interval that is too short compared to the duration of the event was taken in the first embodiment). To do so, the state of the counters is monitored at high frequency during step 25 shown in FIG. 3 (for example several times per second). When at least one counter begins to be incremented, the start of an interval is defined. When it stops being incremented, the end of the interval is defined. It is considered that a counter or a plurality of counters stops being incremented when it is not incremented at the end of a duration of N clock cycles of the electronic video playback device, N being able to be fixed empirically as a function of the desired precision and rapidity of detection. Thus, the start and the end of an event are detected, which makes it possible to detect an event as a whole. A hierarchy between events is thus no longer necessary, since all the events are detected.

In FIG. 4, a first event B (black screen) is detected because at least one counter is incremented at T0 and stops being incremented at T1. Between T1 and T2, no counter is incremented, and at T2 at least one counter is incremented and stops being incremented at T3. The intervals T1-T0 and T2-T1 may have a different duration or may be equal in duration. The interval T2-T1 may be of zero duration.

At T1, the counters representing the transition state T1-T0 are acquired and classified during the step 50 as belonging to a "black screen" incident class: a black screen event is detected. At T3, the counters representing the transition state T3-T2 are acquired and classified during step 50 as belonging to a "freeze" incident class: a screen freeze event is detected.

Figure 5:
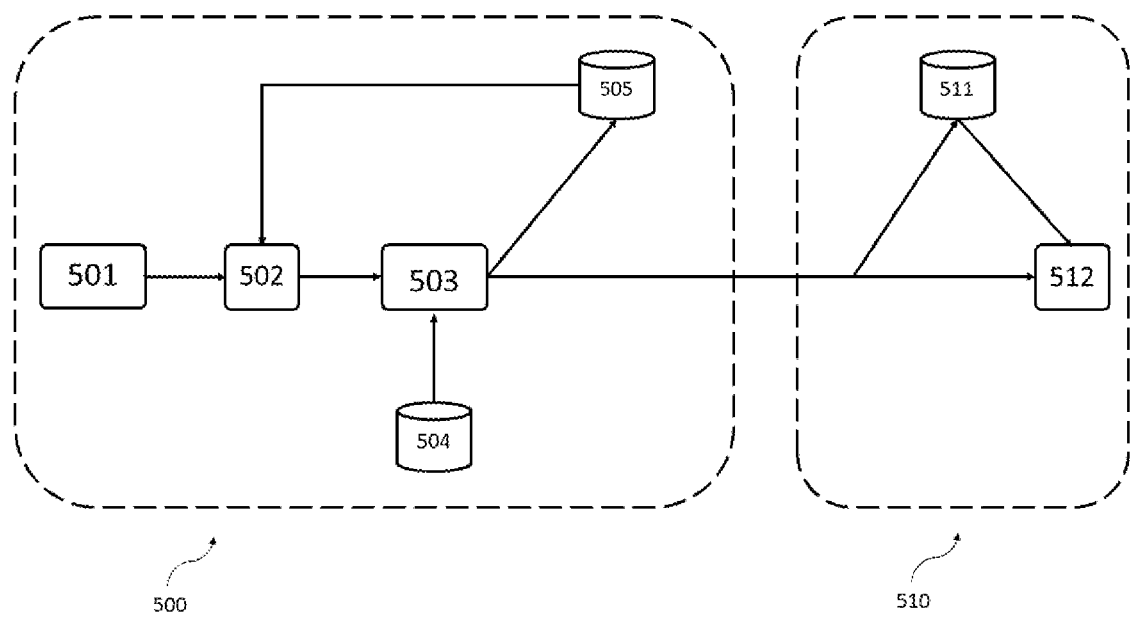
FIG. 5 shows a schematic representation of a first embodiment of a system for detecting video incidents.

FIG. 5 represents a system for detecting video incidents including an electronic video playback device 500 and a remote system 510 for receiving and for analysing an incident message.

The electronic video playback device 500 includes a module 501 for creation of messages, a reception and subtraction module 502, a classification module 503, a model recording module 504 and a message recording module 505. The device 500 includes at least one calculator for processing data, a memory for storing data, a network card for receiving a video stream and a graphics card to play back the video coming from the video stream on a screen. The device 500 may be for example a set top box, a video sound box, a portable telephone or a tablet. In an embodiment, the different modules and calculator are implemented in the form of electronic circuits (e.g. microelectronic circuits) that are constructed and arranged to carry out their respective function(s).

The message creation module 501 creates at least one message including at least one counter. The reception and subtraction module 502 is configured to carry out the steps 30 of acquisition of a message and 40 subtraction of the acquired message from the recorded message of the method 100. To do so, the module 502 is connected to the module 501 to receive at least one message or to make a request for at least one message, and it is connected to the message recording module 505. The message recording module 505 is configured to carry out the step 80 of recording at least one message including at least one counter. It includes for example a memory and may be a database. Thus, the module 502 is capable of subtracting a message received from the module 501 with a message recorded in the module 505 to obtain a transition state of the device 500.

The classification module 503 is configured to carry out the step 50 of classification of the transition state of the device 500. To do so, the classification module 503 implements a supervised automatic learning algorithm such as a gradient tree boosting algorithm and uses a classification model stored by the model recording module 504. This model was estimated and validated during the steps 10 of training and 20 of validation of the method 100.

The classification module 503 is further configured to carry out the step 60 of detection of a video incident including the creation of an incident message when the transition state is classed as belonging to a class among at least one class representative of a video incident of the played back video.

The classification module 503 is further configured to carry out the step 70 of transmission of an incident message to a system 510 remote from the electronic video playback device 500. This remote system 510 may be for example an electronic device accessible via a network.

The classification module 503 is further configured to transmit the acquired message to the message recording module 505, in order that the message recording module 505 records the acquired message.

The remote system 510 includes a module for recording an incident message 511 and a module for displaying an incident message 512.

The module for recording an incident message 511 includes a memory to record an incident message transmitted by the classification device 503.

The module for displaying an incident message 512 is configured to receive an incident message transmitted by the classification device 503 and display it on a screen, in order that an expert in the field or an operator analyses it. The module 512 is further configured to make an incident message request to the storage module 511 in order to display a prior incident message.

Figure 6:
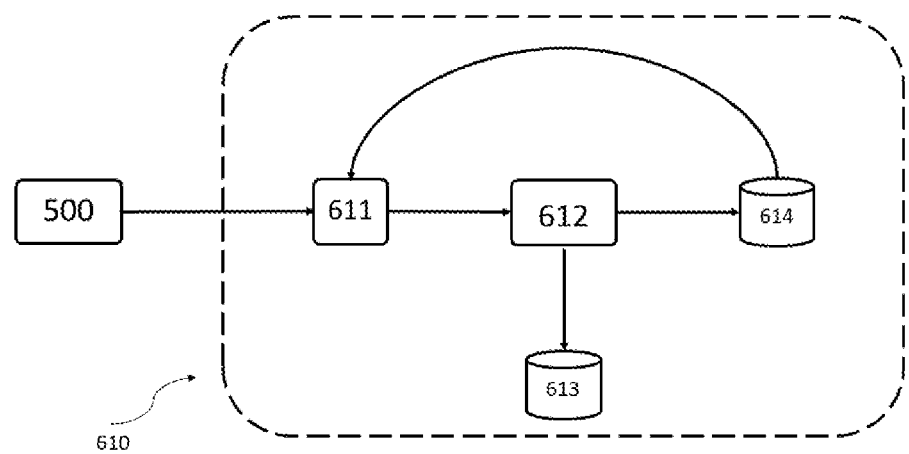
FIG. 6 shows a schematic representation of a first embodiment of a system for training an algorithm for detecting video incidents.

FIG. 6 represents a system for training a supervised automatic learning algorithm in order to create a classification model.

The training system includes an electronic video playback device 500 and a training system 610, and is configured to carry out the steps of training 10 and validation 20 of the classification model of the method 100.

The device 500 is configured to transmit messages including a label corresponding to a class to the training system 610.

The training system 610 is remote from the device 500. It may be accessible via a network. It includes a subtraction module 611, a model creation module 612, a model recording module 613 and a message recording module 614.

The subtraction module 611 is configured to carry out the subtraction of an annotated message received from the device 600 with an annotated message recorded by the message recording device 614.

The model creation module 612 implements the same supervised automatic learning algorithm as the module 503 of FIG. 5, for example a tree gradient boosting type algorithm. The model creation module 612 receives from the subtraction module 611 an annotated transition state and creates and optimises a model that it records as the iterations go on in the model recording module 613.

Beneficially, the system 610 is remote from the electronic video playback device 500 because steps 10 and 20 of the method 100 require a lot of resources, of which the device 500 does not necessarily have available. The system 610 may be connected to several devices 500 in order to receive numerous annotated messages and to optimise as best as possible its model to the different incidents and counters that it could encounter.

Figure 7:
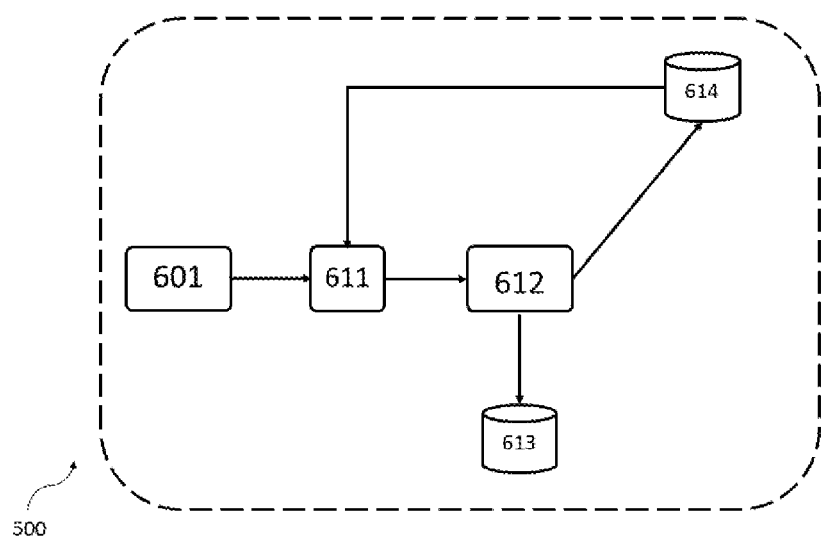
FIG. 7 shows a schematic representation of a second embodiment of a system for training an algorithm for detecting video incidents.

The steps 10 of training and 20 of validation may be carried out by the electronic video playback device 500 in a non-beneficial alternative represented in FIG. 7.

FIG. 7 thus represents the device 500 including the modules 611 for subtraction, 612 model creation, 613 model recording and 614 recording of an annotated message. It also includes the message creation module 501 represented in FIG. 5.

Figure 8:
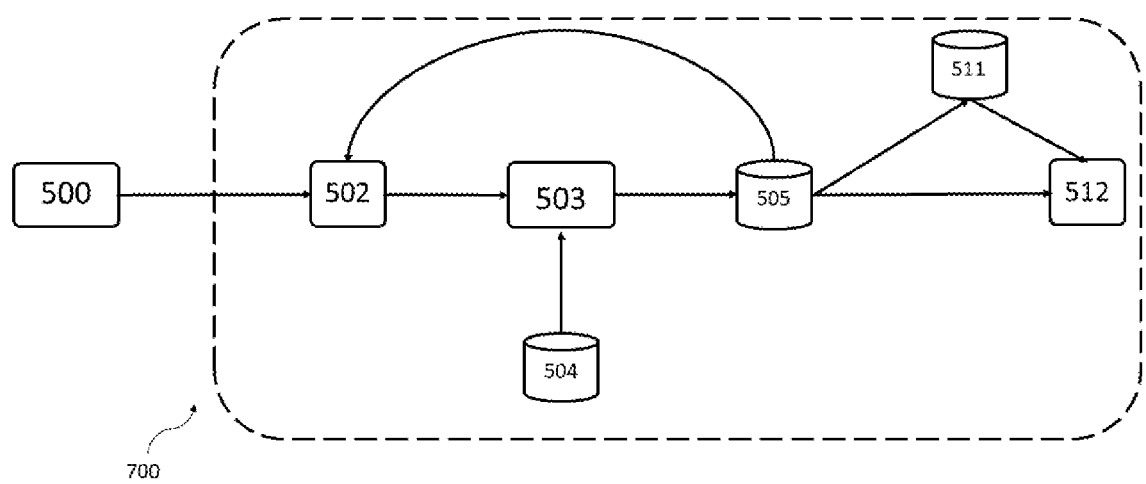
FIG. 8 shows a schematic representation of a second embodiment of a system for detecting video incidents.

FIG. 8 represents an alternative to the embodiment according to FIG. 5, where the method 100 is carried out by a system remote from the electronic video playback device 500. In FIG. 7, the electronic video playback device 500 sends at least one message to the remote system for detecting video incidents 700. The system 700 includes: the module for subtraction of messages 502, the classification module 503 implementing a supervised automatic learning algorithm, the model recording module 504, storing a model estimated and validated during steps 10 and 20 of the method 100, the module 505 for storing messages, the module 511 for storing incident messages, and the module 512 for displaying incident messages.

The alternative shown in FIG. 8 is not the most beneficial because it requires sending each message including counters through the network to reach the remote system 500, whereas the embodiment according to FIG. 5 does not require the sending of incident messages, when a video incident has been detected, through the network, resulting in a lower loading of the network linking the electronic video playback device 500 and the remote system 510.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. A single processor or several other units may be used to implement the invention. The different characteristics described and/or claimed may be beneficially combined. Their presence in the description or in the different dependent claims do not exclude this possibility. The reference signs cannot be understood as limiting the scope of the invention.

The invention claimed is:

1. A method for automatically detecting video incidents on a video played back by an electronic video playback device, the method comprising:
   acquiring a first message transmitted by the electronic video playback device, said first message including at least one counter representing the state of the electronic video playback device;
   subtracting the at least one counter included in the first message previously acquired from the at least one counter included in a second message acquired prior to the first message, the at least one counter included in the second message being stored in a database and corresponding to a preceding state of the electronic video playback device to obtain a transition state of the electronic video playback device;
   classifying, by a supervised automatic learning algorithm using a classification model, of the transition state as belonging to a class representative of a normal state of the played back video, or as belonging to a class among at least one class representative of a video incident on the played back video;
   performing a video incident detection including the creation of an incident message when a transition state is classified as belonging to a class representative of a video incident on the played back video, said incident message including a label corresponding to the detected video incident, said transition state and said first acquired message;
   transmitting the incident message to a remote system;
   recording the first message previously acquired in the database.

2. The method for automatically detecting video incidents according to claim 1, wherein the method is repeated at least twice.

3. The method for automatically detecting video incidents according to claim 2, wherein the repetition is carried out at fixed time intervals.

4. The method for automatically detecting video incidents according to claim 2, wherein the repetition is carried out at variable time intervals.

5. The method for automatically detecting video incidents according to claim 1, further comprising
   a. performing a dimensionality reduction of the first message including the reduction of the number of counters included in the first message.

6. The method for automatically detecting video incidents according to claim 1, further comprising:
   a. training the supervised automatic learning algorithm to create a classification model, using a set of training data including at least one annotated message as belonging to a class representative of a normal state of the played back video, or as belonging to a class among at least one class representative of a video incident on the played back video, the message including at least one counter;
   b. testing the classification model using a set of test data including at least one non-annotated message.

7. The method for automatically detecting video incidents according to claim 1, wherein the supervised automatic learning algorithm is an algorithm of a type among those of gradient tree boosting, support vector machines, neural networks, decision trees.

8. The method for automatically detecting video incidents according to claim 1, wherein the method is implemented by at least one system remote from the electronic video playback device.

9. An electronic video playback device implementing the method according to claim 1, comprising:
   a. a module for acquisition and subtraction of the first message, configured to carry out the steps of acquisition and subtraction of the first message;
   b. a classification module, configured to carry out the steps of classification, incident detection, and transmission of the incident message;
   c. a model recording module, configured to store the classification model;
   d. a message recording module, configured to carry out the step of recording the first message.

10. A system for detecting video incidents, comprising the electronic video playback device according to claim 9 and a remote system for receiving and for displaying an incident message including:
   a. a module for recording an incident message;
   b. a module for displaying an incident message on a screen for analysis by an expert in the field.

11. A non-transitory computer readable medium including instructions which, when executed by a computer, lead the computer to implement the method according to claim 1.

* * * * *